(12) United States Patent
Xu et al.

(10) Patent No.: US 11,470,598 B2
(45) Date of Patent: Oct. 11, 2022

(54) TRANSMITTING DATA IN A CONTROL CHANNEL

(71) Applicant: QUALCOMM Incorporated, San Diego, CA (US)

(72) Inventors: Changlong Xu, Beijing (CN); Chao Wei, Beijing (CN); Liangming Wu, Beijing (CN); Peng Cheng, Beijing (CN); Kai Chen, Guangdong (CN); Hao Xu, Beijing (CN); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/044,709

(22) PCT Filed: Apr. 2, 2019

(86) PCT No.: PCT/CN2019/080916
§ 371 (c)(1),
(2) Date: Oct. 1, 2020

(87) PCT Pub. No.: WO2019/192447
PCT Pub. Date: Oct. 10, 2019

(65) Prior Publication Data
US 2021/0099982 A1 Apr. 1, 2021

(30) Foreign Application Priority Data

Apr. 4, 2018 (WO) ................ PCT/CN2018/081860

(51) Int. Cl.
*H04W 4/00* (2018.01)
*H04W 72/04* (2009.01)
*H04L 1/00* (2006.01)

(52) U.S. Cl.
CPC ......... *H04W 72/042* (2013.01); *H04L 1/0057* (2013.01); *H04W 72/0413* (2013.01)

(58) Field of Classification Search
None
See application file for complete search history.

(56) References Cited

U.S. PATENT DOCUMENTS

| | | | | |
|---|---|---|---|---|
| 2008/0089281 A1* | 4/2008 | Yoon | ................... | H04W 72/042 370/329 |
| 2013/0176952 A1* | 7/2013 | Shin | ...................... | H04L 5/0092 370/329 |

(Continued)

FOREIGN PATENT DOCUMENTS

| | | |
|---|---|---|
| CN | 102333381 A | 1/2012 |
| CN | 102957500 A | 3/2013 |

(Continued)

OTHER PUBLICATIONS

International Search Report and Written Opinion—PCT/CN2018/081860—ISA/EPO—dated Jan. 8, 2019.

(Continued)

*Primary Examiner* — Clemence S Han
(74) *Attorney, Agent, or Firm* — Qualcomm Incorporated

(57) ABSTRACT

Aspects of the disclosure relate to wireless communication. In some aspects, a user equipment (UE) may receive an indicator, in a physical downlink control channel (PDCCH) payload, that indicates whether the PDCCH payload includes data or downlink control information (DCI) for obtaining the data, wherein the indicator is an initial state of a cyclic redundancy check that includes a predefined sequence of bits; and obtain at least one of the data or the DCI based at least in part on the indicator. Numerous other aspects are provided.

38 Claims, 13 Drawing Sheets

(56) References Cited

U.S. PATENT DOCUMENTS

| | | | |
|---|---|---|---|
| 2013/0242751 A1* | 9/2013 | Li | H04W 28/18 |
| | | | 370/329 |
| 2015/0092646 A1 | 4/2015 | Tabet et al. | |
| 2019/0182096 A1* | 6/2019 | Bin Sediq | H04W 72/042 |
| 2020/0007161 A1* | 1/2020 | Dikarev | H03M 13/2703 |

FOREIGN PATENT DOCUMENTS

| | | | |
|---|---|---|---|
| WO | 2011153700 A1 | 12/2011 | |
| WO | 2013063780 A1 | 5/2013 | |

OTHER PUBLICATIONS

International Search Report and Written Opinion—PCT/CN2019/080916—ISA/EPO—dated Jun. 17, 2019.
Qualcomm Incorporated: "Performance of Polar Codes for Very Small Block Length", 3GPP Draft, 3GPP TSG-RAN WG1 NR Ad-Hoc#2, R1-1711557, Performance of Polar Codes for Very Small Block Length, 3rd Generation Partnership Project (3GPP), Mobile Competence Centre, 650, Route Des Lucioles, F-06921 Sophia-Antipolis, vol. RAN WG1, No. Qingdao, Jun. 27-Jun. 30, 2017, Jun. 26, 2017 (Jun. 26, 2017), XP051300741, 10 Pages, Retrieved from the Internet: URL: http://www.3gpp.org/ftp/Meetings_3GPP_SYNC/RAN1/Docs/. [Retrieved on Jun. 26, 2017].
Supplementary European Search Report—EP19781874—Search Authority—The Hague—dated Dec. 1, 2021.

* cited by examiner

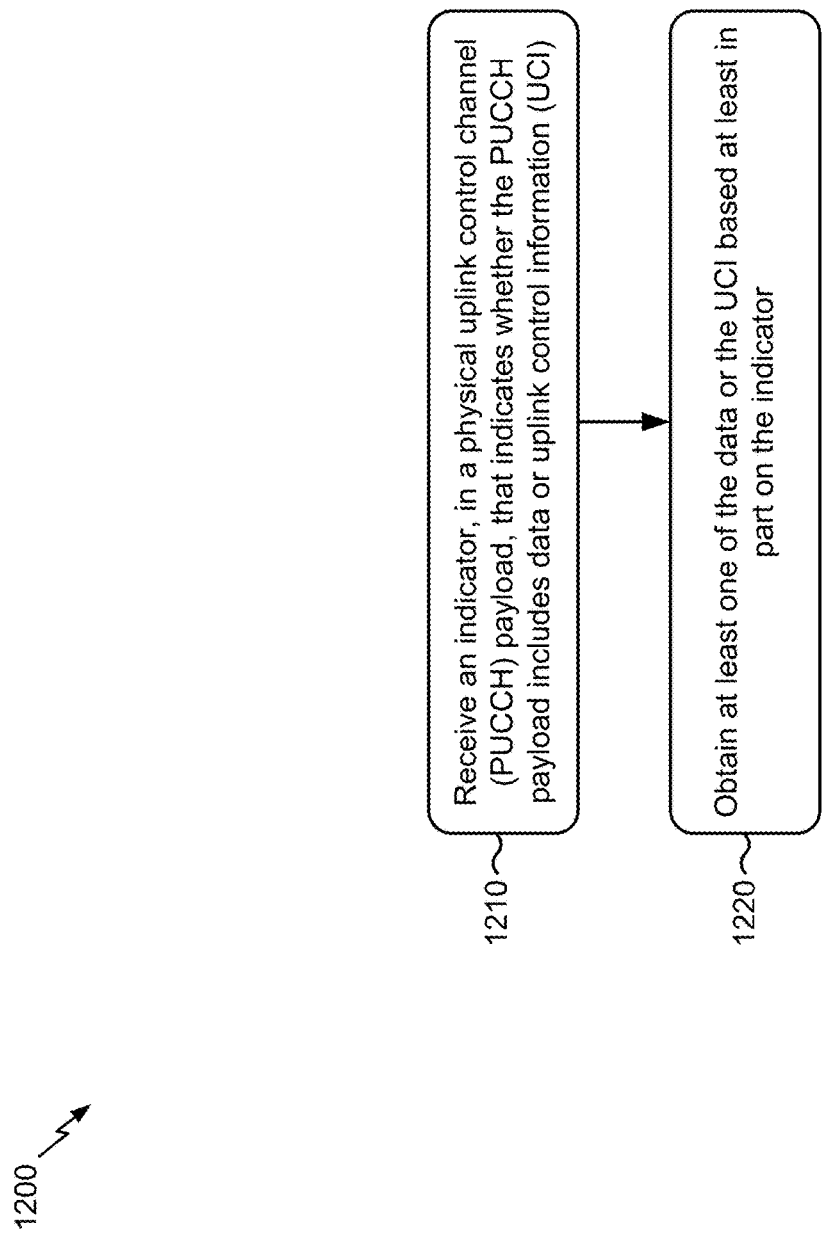

TRANSMITTING DATA IN A CONTROL CHANNEL

CROSS-REFERENCE TO RELATED APPLICATIONS

This application is a 371 national stage of PCT Application No. PCT/CN2019/080916 filed on Apr. 2, 2019, entitled "TRANSMITTING DATA IN A CONTROL CHANNEL," which claims priority to Patent Cooperation Treaty (PCT) Application No. PCT/CN2018/081860, filed on Apr. 4, 2018, entitled "TECHNIQUES AND APPARATUSES FOR TRANSMITTING DATA IN A CONTROL CHANNEL," which are hereby expressly incorporated by reference herein.

FIELD OF THE DISCLOSURE

Aspects of the present disclosure generally relate to wireless communication, and more particularly to techniques and apparatuses for transmitting data in a control channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indicator, in a physical downlink control channel (PDCCH) payload, that indicates whether the PDCCH payload includes data or downlink control information (DCI) for obtaining the data, wherein the indicator is an initial state of a cyclic redundancy check that includes a predefined sequence of bits; and obtaining at least one of the data or the DCI based at least in part on the indicator.

In some aspects, a UE for wireless communication may include memory and one or more processors coupled to the memory. The memory and the one or more processors may be configured to receive an indicator, in a physical downlink control channel (PDCCH) payload, that indicates whether the PDCCH payload includes data or downlink control information (DCI) for obtaining the data, wherein the indicator is an initial state of a cyclic redundancy check that includes a predefined sequence of bits; and obtain at least one of the data or the DCI based at least in part on the indicator.

In some aspects, a non-transitory computer-readable medium may store one or more instructions for wireless communication. The one or more instructions, when executed by one or more processors of a UE, may cause the one or more processors to receive an indicator, in a physical downlink control channel (PDCCH) payload, that indicates whether the PDCCH payload includes data or downlink control information (DCI) for obtaining the data, wherein the indicator is an initial state of a cyclic redundancy check that includes a predefined sequence of bits; and obtain at least one of the data or the DCI based at least in part on the indicator.

In some aspects, an apparatus for wireless communication may include means for receiving an indicator, in a physical downlink control channel (PDCCH) payload, that indicates whether the PDCCH payload includes data or downlink control information (DCI) for obtaining the data, wherein the indicator is an initial state of a cyclic redundancy check that includes a predefined sequence of bits; and means for obtaining at least one of the data or the DCI based at least in part on the indicator.

In some aspects, a method of wireless communication, performed by a base station, may include determining whether to transmit data in a physical downlink control channel (PDCCH) payload or a physical downlink shared channel (PDSCH) payload based at least in part on a size of the data; transmitting an indicator, in the PDCCH payload, that indicates whether the PDCCH payload includes the data or downlink control information (DCI) for obtaining the data from the PDSCH payload, wherein the indicator is an initial state of a cyclic redundancy check that includes a predefined sequence of bits; and selectively transmitting the data in the PDCCH payload or the PDSCH payload based at least in part on the size of the data.

In some aspects, a base station for wireless communication may include memory and one or more processors coupled to the memory. The memory and the one or more processors may be configured to determine whether to transmit data in a physical downlink control channel (PDCCH) payload or a physical downlink shared channel (PDSCH) payload based at least in part on a size of the data; transmit an indicator, in the PDCCH payload, that indicates whether the PDCCH payload includes the data or downlink control information (DCI) for obtaining the data from the PDSCH payload, wherein the indicator is an initial state of a cyclic redundancy check that includes a predefined sequence of bits; and selectively transmit the data in the PDCCH payload or the PDSCH payload based at least in part on the size of the data.

In some aspects, a non-transitory computer-readable medium may store one or more instructions for wireless communication. The one or more instructions, when executed by one or more processors of a base station, may cause the one or more processors to determine whether to transmit data in a physical downlink control channel (PDCCH) payload or a physical downlink shared channel (PDSCH) payload based at least in part on a size of the data; transmit an indicator, in the PDCCH payload, that indicates whether the PDCCH payload includes the data or downlink control information (DCI) for obtaining the data from the PDSCH payload, wherein the indicator is an initial state of a cyclic redundancy check that includes a predefined sequence of bits; and selectively transmit the data in the PDCCH payload or the PDSCH payload based at least in part on the size of the data.

In some aspects, an apparatus for wireless communication may include means for determining whether to transmit data in a physical downlink control channel (PDCCH) payload or a physical downlink shared channel (PDSCH) payload based at least in part on a size of the data; means for transmitting an indicator, in the PDCCH payload, that indicates whether the PDCCH payload includes the data or downlink control information (DCI) for obtaining the data from the PDSCH payload, wherein the indicator is an initial state of a cyclic redundancy check that includes a predefined sequence of bits; and means for selectively transmitting the data in the PDCCH payload or the PDSCH payload based at least in part on the size of the data.

In some aspects, a method of wireless communication, performed by a user equipment (UE), may include determining whether to transmit data in a physical uplink control channel (PUCCH) payload or a physical uplink shared channel (PUSCH) payload based at least in part on a size of the data; and selectively transmitting the data in the PUCCH payload or the PUSCH payload based at least in part on the size of the data, wherein the PUCCH payload includes an indicator that indicates whether the PUCCH payload includes the data or uplink control information (UCI), wherein the indicator is an initial state of a cyclic redundancy check that includes a predefined sequence of bits.

In some aspects, a UE for wireless communication may include memory and one or more processors coupled to the memory. The memory and the one or more processors may be configured to determine whether to transmit data in a physical uplink control channel (PUCCH) payload or a physical uplink shared channel (PUSCH) payload based at least in part on the size of the data; and selectively transmit the data in the PUCCH payload or the PUSCH payload based at least in part on the size of the data, wherein the PUCCH payload includes an indicator that indicates whether the PUCCH payload includes the data or uplink control information (UCI), wherein the indicator is an initial state of a cyclic redundancy check that includes a predefined sequence of bits.

In some aspects, a non-transitory computer-readable medium may store one or more instructions for wireless communication. The one or more instructions, when executed by one or more processors of a UE, may cause the one or more processors to determine whether to transmit data in a physical uplink control channel (PUCCH) payload or a physical uplink shared channel (PUSCH) payload based at least in part on a size of the data; and selectively transmit the data in the PUCCH payload or the PUSCH payload based at least in part on the size of the data, wherein the PUCCH payload includes an indicator that indicates whether the PUCCH payload includes the data or uplink control information (UCI), wherein the indicator is an initial state of a cyclic redundancy check that includes a predefined sequence of bits.

In some aspects, an apparatus for wireless communication may include means for determining whether to transmit data in a physical uplink control channel (PUCCH) payload or a physical uplink shared channel (PUSCH) payload based at least in part on a size of the data; and means for selectively transmitting the data in the PUCCH payload or the PUSCH payload based at least in part on the size of the data, wherein the PUCCH payload includes an indicator that indicates whether the PUCCH payload includes the data or uplink control information (UCI), wherein the indicator is an initial state of a cyclic redundancy check that includes a predefined sequence of bits.

In some aspects, a method of wireless communication, performed by a base station, may include receiving an indicator, in a physical uplink control channel (PUCCH) payload, that indicates whether the PUCCH payload includes data or uplink control information (UCI), wherein the indicator is an initial state of a cyclic redundancy check that includes a predefined sequence of bits; and obtaining at least one of the data or the UCI based at least in part on the indicator.

In some aspects, a base station for wireless communication may include memory and one or more processors coupled to the memory. The memory and the one or more processors may be configured to receive an indicator, in a physical uplink control channel (PUCCH) payload, that indicates whether the PUCCH payload includes data or uplink control information (UCI), wherein the indicator is an initial state of a cyclic redundancy check that includes a predefined sequence of bits; and obtain at least one of the data or the UCI based at least in part on the indicator.

In some aspects, a non-transitory computer-readable medium may store one or more instructions for wireless communication. The one or more instructions, when executed by one or more processors of a base station, may cause the one or more processors to receive an indicator, in a physical uplink control channel (PUCCH) payload, that indicates whether the PUCCH payload includes data or uplink control information (UCI), wherein the indicator is an initial state of a cyclic redundancy check that includes a predefined sequence of bits; and obtain at least one of the data or the UCI based at least in part on the indicator.

In some aspects, an apparatus for wireless communication may include means for receiving an indicator, in a physical uplink control channel (PUCCH) payload, that indicates whether the PUCCH payload includes data or uplink control information (UCI), wherein the indicator is an initial state of a cyclic redundancy check that includes a predefined sequence of bits; and means for obtaining at least one of the data or the UCI based at least in part on the indicator.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9-12 are diagrams illustrating example processes relating to transmitting data in a control channel, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
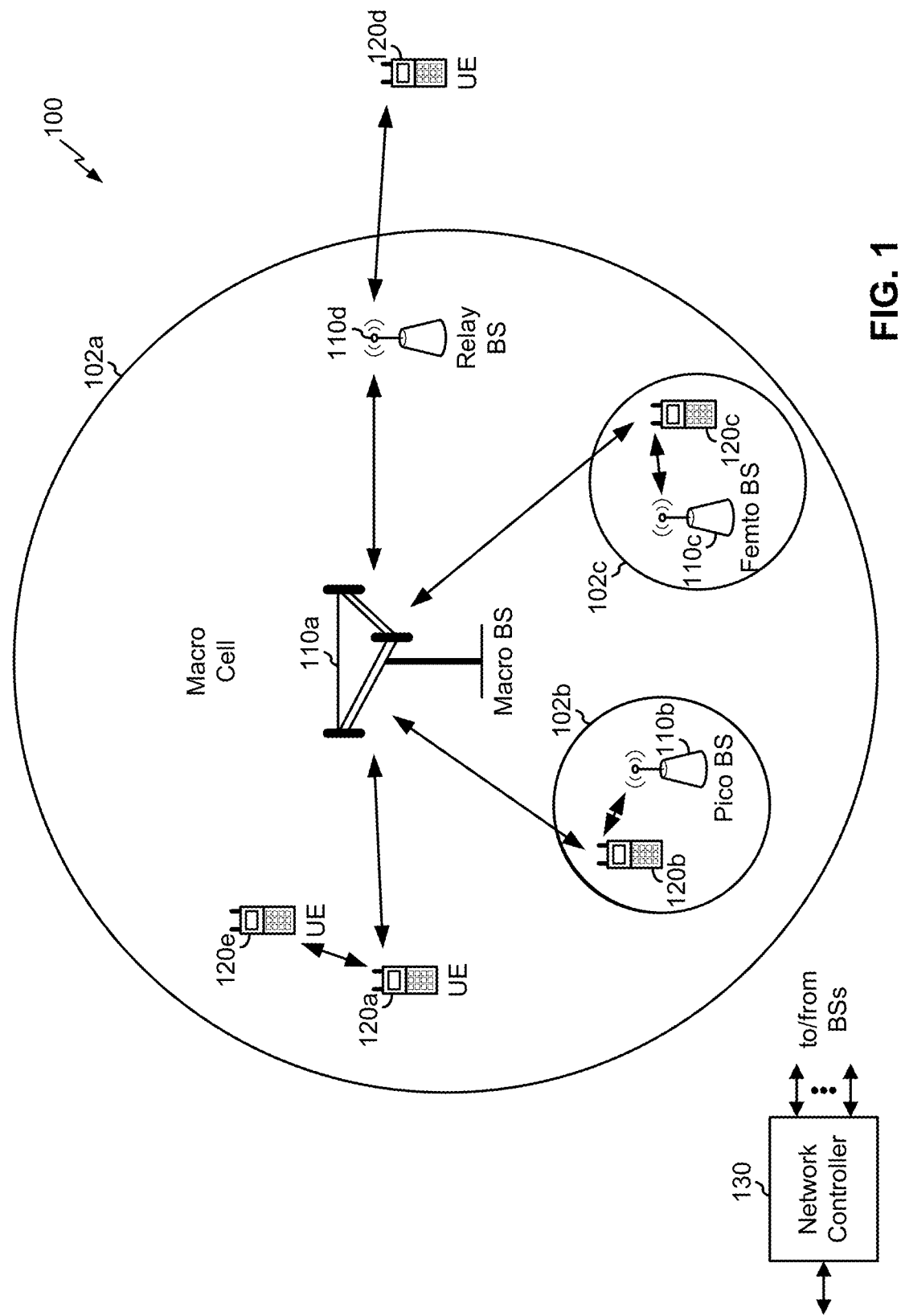
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
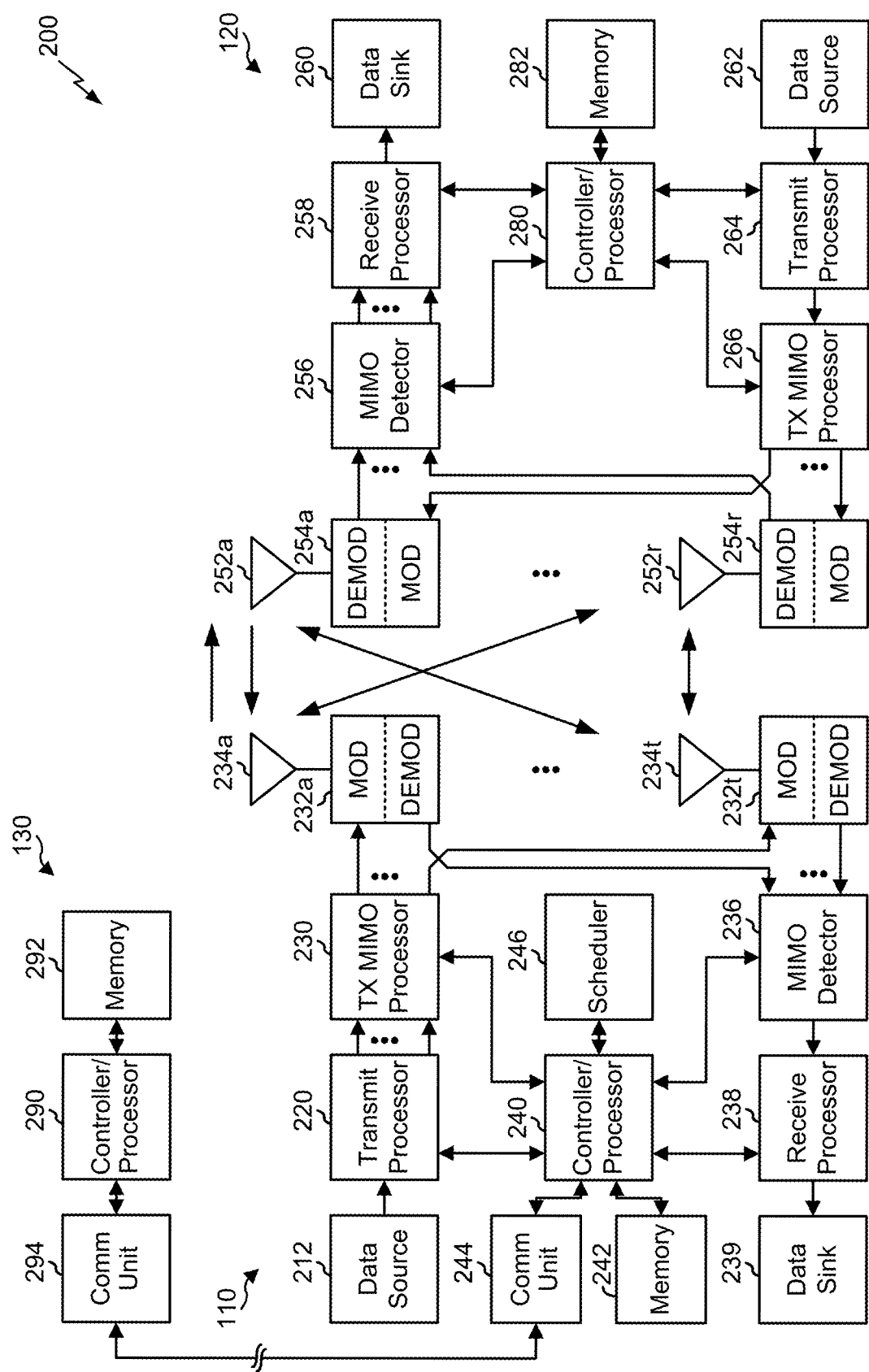
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with transmitting data in a control channel, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indicator, in a physical downlink control channel (PDCCH) payload, that indicates whether the PDCCH payload includes data or downlink control information (DCI) for obtaining the data; means for obtaining at least one of the data or the DCI based at least in part on the indicator; and/or the like. Additionally, or alternatively, UE 120 may include means for determining whether to transmit data in a physical uplink control channel (PUCCH) payload or a physical uplink shared channel (PUSCH) payload based at least in part on a size of the data; means for selectively transmitting the data in the PUCCH payload or the PUSCH payload based at least in part on the size of the data, wherein the PUCCH payload includes an indicator that indicates whether the PUCCH payload includes the data or uplink control information (UCI); and/or the like. In some aspects, such means may include one or more components of UE 120 described in connection with FIG. 2.

In some aspects, base station 110 may include means for determining whether to transmit data in a physical downlink control channel (PDCCH) payload or a physical downlink shared channel (PDSCH) payload based at least in part on a size of the data; means for transmitting an indicator, in the PDCCH payload, that indicates whether the PDCCH payload includes the data or downlink control information (DCI) for obtaining the data from the PDSCH payload; means for selectively transmitting the data in the PDCCH payload or the PDSCH payload based at least in part on the size of the data; and/or the like. Additionally, or alternatively, base station 110 may include means for receiving an indicator, in a physical uplink control channel (PUCCH) payload, that indicates whether the PUCCH payload includes data or uplink control information (UCI); means for obtaining at least one of the data or the UCI based at least in part on the indicator; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
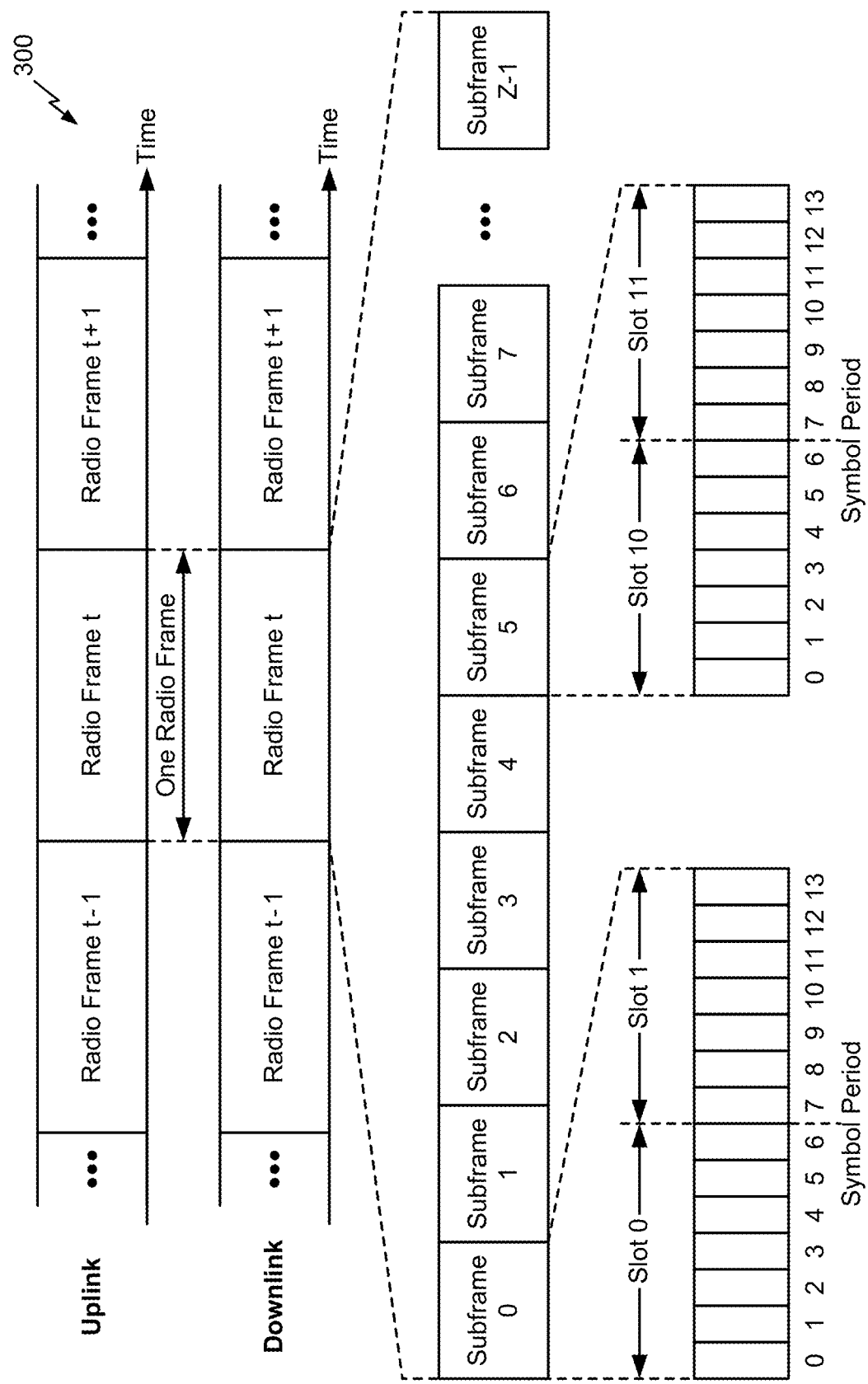
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
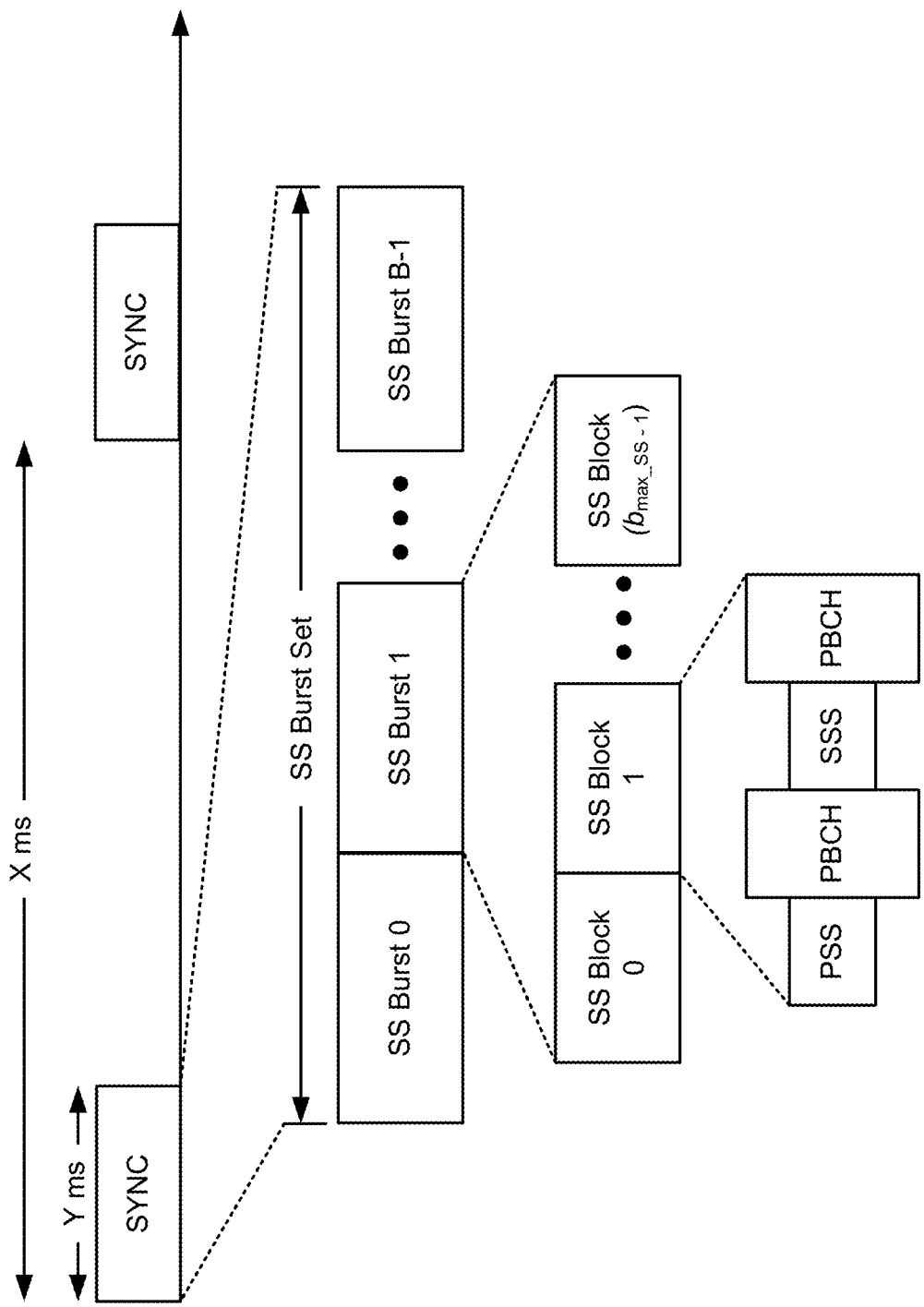
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
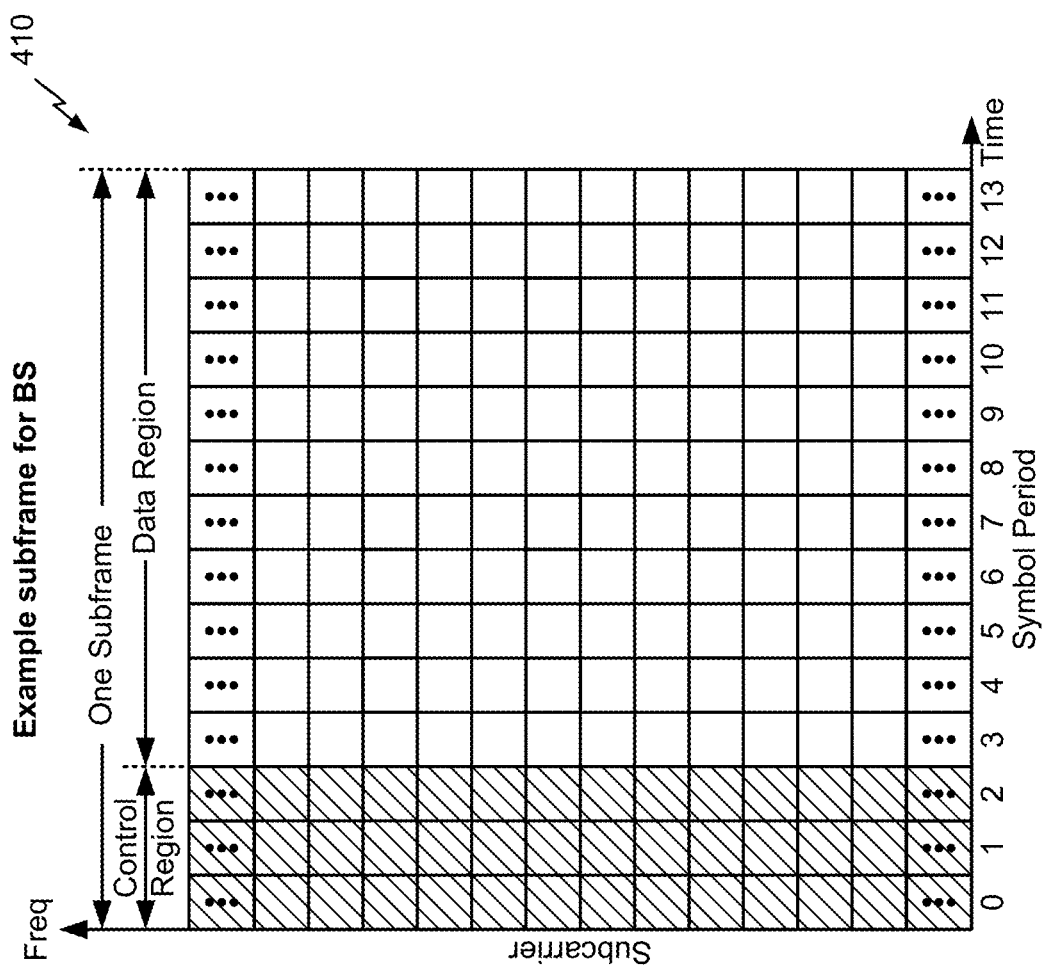
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM)

on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
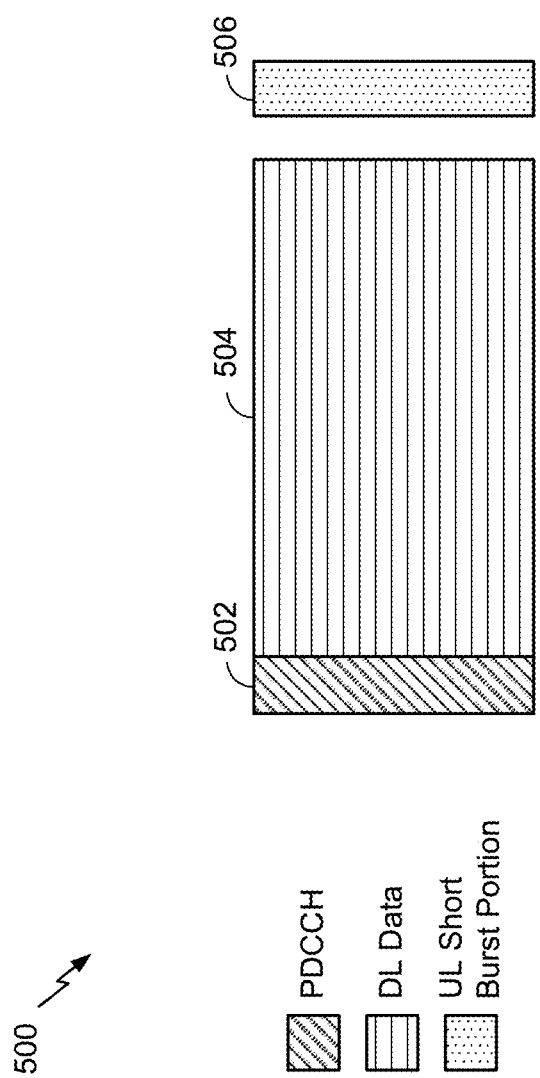
FIG. 5 is a diagram illustrating an example of a downlink (DL)-centric subframe, in accordance with various aspects of the present disclosure.

FIG. 5 is a diagram 500 showing an example of a DL-centric subframe or wireless communication structure. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

Figure 6:
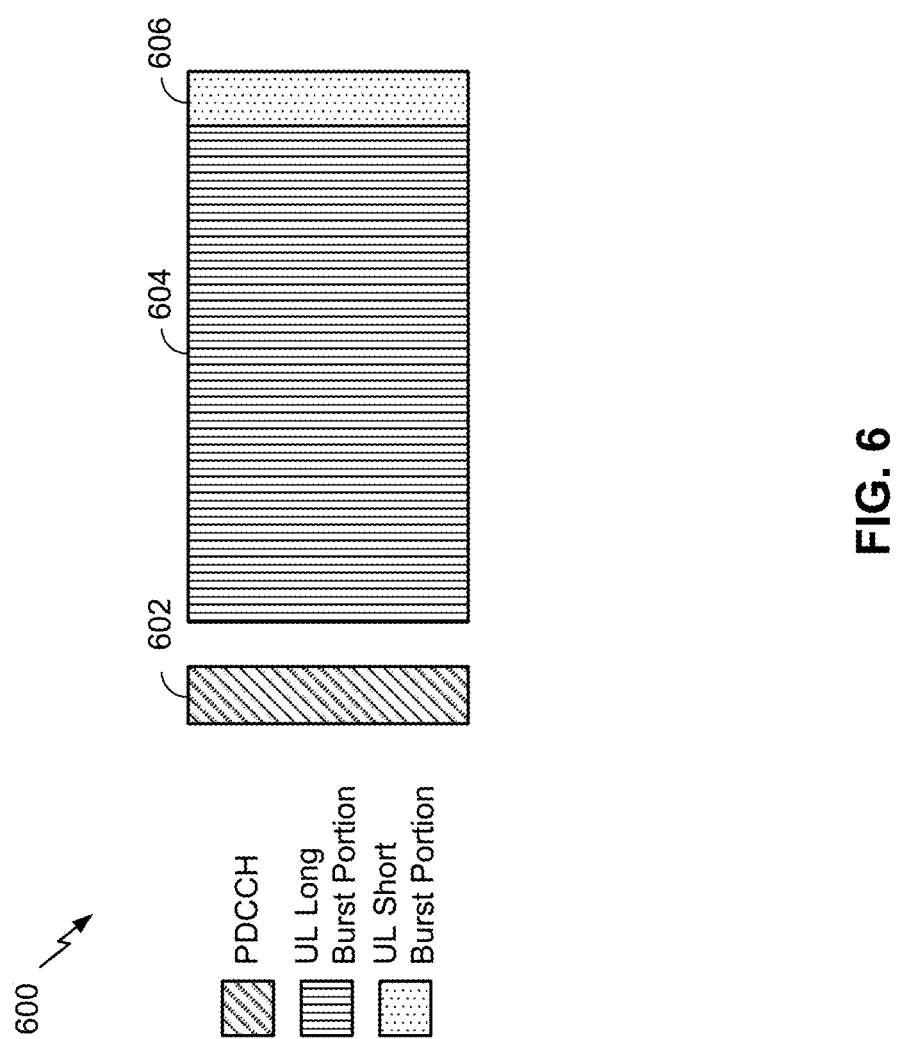
FIG. 6 is a diagram illustrating an example of an uplink (UL)-centric subframe, in accordance with various aspects of the present disclosure.

FIG. 6 is a diagram 600 showing an example of an UL-centric subframe or wireless communication structure. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UEto-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples are possible and may differ from what was described with regard to FIG. 6.

Figure 7:
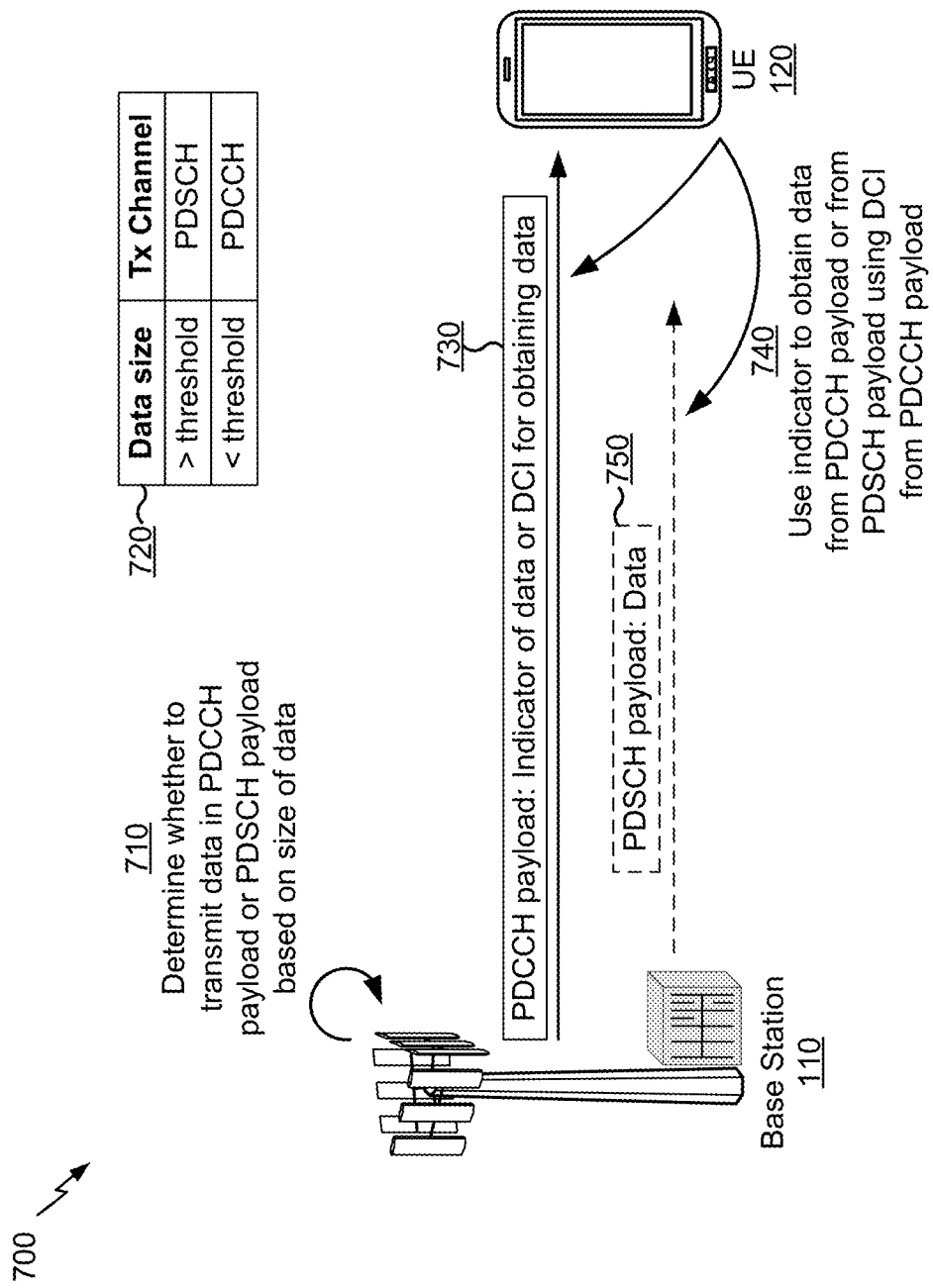
FIGS. 7 and 8 are diagrams illustrating examples of transmitting data in a control channel, in accordance with various aspects of the present disclosure.

FIG. 7 is a diagram illustrating an example 700 of transmitting data in a control channel, in accordance with various aspects of the present disclosure.

As shown in FIG. 7, a base station 110 and a UE 120 may communicate with one another. For example, the base station 110 may transmit downlink data (e.g., a protocol data unit (PDU) in the media access control (MAC) layer, and/or the like) to the UE 120. In some cases, the downlink data may be transmitted on a PDSCH. However, in some scenarios, transmitting data on the PDSCH may be inefficient. For example, when data is transmitted on the PDSCH, downlink control information (DCI) must first be transmitted on the PDCCH. The DCI indicates information used to obtain and/or decode the data on the PDSCH, such as a modulation and coding scheme (MCS) used to modulate and/or encode the data, a resource allocation for the data (e.g., one or more resource blocks on which the data is to be transmitted), and/or the like. This design may be efficient for a large amount of data, but may be inefficient for a small amount of data. This may lead to inefficient use of device and/or network resources, particularly in scenarios where small data packets are communicated more frequently than large data packets, such as when the UE 120 is an IoT UE, when the UE 120 is using a service or application that uses a small amount of data, when small packets are being reported (e.g., a timing advance (TA) value, a buffer status report (BSR)), and/or the like.

As an example, for data with a small packet size of 60 bits, 40 bits of PDCCH payload may be used to indicate DCI for obtaining the data, and 60 bits of PDSCH payload may be used to transmit the data, for a total of 100 bits that consume network and device resources. Since the payload size of the PDCCH is around 40 to 140 bits, this small amount of data may be transmitted directly in the PDCCH, for a total of 60 bits that consume network and device resources, thereby saving 40 bits of consumed resources as compared to transmitting the data in the PDSCH. Furthermore, in 5G/NR, information carried on the PDCCH may be encoded using polar coding, and information carried on the PDSCH may be encoded using low-density parity-check (LDPC) coding. For small block sizes, polar coding outperforms LDPC coding, and thus small amounts of data may be transmitted more reliably on the PDCCH as compared to the PDSCH.

However, if the base station 110 sometimes transmits data on the PDCCH, and sometimes transmits data on the PDSCH and uses the PDCCH to transmit DCI for obtaining the data on the PDSCH, then the UE 120 may encounter errors if the UE 120 is unable to determine how to interpret and/or use the information (e.g., data or DCI) received on the PDCCH. Some techniques and apparatus described herein permit the base station 110 to indicate whether the PDCCH is being used to carry data or DCI, thereby reducing errors at the UE 120 and allowing for dynamic use of the PDCCH or the PDSCH for data transmission depending on a size of the data. In this way, the PDCCH may be used for increased efficiency when the data is small, and the PDSCH may be used for increased efficiency when the data is large. Additional details are described below.

As shown by reference number 710, the base station 110 may determine whether to transmit data in a PDCCH payload or a PDSCH payload based at least in part on a size of the data. For example, as shown by reference number 720, the base station 110 may determine to transmit the data in the PDSCH payload when the size of the data satisfies a threshold (e.g., is greater than the threshold, is greater than or equal to the threshold, and/or the like). Conversely, the base station 110 may determine to transmit the data in the PDCCH payload when the size of the data does not satisfy the threshold (e.g., is less than the threshold, is less than or equal to the threshold, and/or the like).

In some aspects, the threshold may be determined based at least in part on a size of the PDCCH payload. For example, if data is not to be segmented across multiple PDCCH payloads, then the threshold may be equal to the size of the PDCCH payload. In this way, the data may be transmitted in the PDCCH payload if the size of the data is less than or equal to the size of the PDCCH payload, and may be transmitted on the PDSCH otherwise. In some aspects, the size of the PDCCH payload may be determined based at least in part on a transmission mode for communications between the base station 110 and the UE 120. Thus, in some aspects, the threshold may be determined based at least in part on the transmission mode. Additionally, or alternatively, the size of the PDCCH payload may be determined based at least in part on an aggregation level to be used for communications between the base station 110 and the UE 120, which may be determined based at least in part on channel conditions. Thus, in some aspects, the threshold may be determined based at least in part on the aggregation level and/or channel conditions.

In some aspects, the base station 110 may determine to segment the data across multiple PDCCH payloads. In this case, the threshold may be greater than the size of a single PDCCH payload. In some aspects, the threshold may be determined based at least in part on a combined size of a number of PDCCH payloads, so as to limit segmentation of the data across no more than a threshold number of PDCCH payloads. Additionally, or alternatively, the base station 110 may use multiple thresholds to determine whether to transmit the data in a single PDCCH payload, to segment the data across multiple PDCCH payloads, or to transmit the data in a PDSCH payload. For example, the base station 110 may segment the data across multiple PDCCH payloads based at least in part on determining that the size of the data satisfies a first threshold (e.g., is greater than a first threshold for transmitting the data in a single PDCCH payload, is greater than or equal to the first threshold, and/or the like) but does not satisfy a second threshold (e.g., is less than a second threshold for transmitting the data on the PDSCH, is less than or equal to the second threshold, and/or the like).

As shown by reference number 730, the base station 110 may transmit, and the UE 120 may receive, an indicator, in the PDCCH payload, that indicates whether the PDCCH payload includes the data or DCI for obtaining the data from the PDSCH payload. For example, the indicator may indicate that the PDCCH payload includes the DCI, for obtaining the data from the PDSCH, when the size of the data satisfies a threshold (e.g., is greater than the threshold, is greater than or equal to the threshold, and/or the like). Conversely, the indicator may indicate that the PDCCH payload includes the data when the size of the data does not satisfy the threshold (e.g., is less than the threshold, is less than or equal to the threshold, and/or the like). In some aspects, the base station 110 may encode the PDCCH payload using polar coding.

In some aspects, the indicator is included in a bit field, of the PDCCH payload, dedicated to indicating whether the PDCCH payload includes data or DCI. In some aspects, the indicator may be a binary indicator of one bit, where a first value of the bit indicates that the PDCCH payload includes data, and a second value of the bit indicates that the PDCCH payload includes DCI. In some aspects, the indicator may be multiple bits. In this case, different values of the indicator may indicate whether the PDCCH payload includes only data (and not DCI), includes only DCI (and not data), or includes both data and DCI. Additionally, or alternatively, if the data is included in the PDCCH, then different values of the indicator may indicate whether the data is self-contained within the PDCCH payload (e.g., within a single PDCCH payload) or segmented across multiple PDCCH payloads. Additionally, or alternatively, if the data is segmented across multiple PDCCH payloads, different values of the indicator may indicate a number of PDCCH payloads or segments used to transmit the data (e.g., a number of PDCCH payloads across which the data is segmented), a start of the data (e.g., an indication that a current PDCCH payload includes the start of the data), an end of the data (e.g., an indication that a current PDCCH payload includes the end of the data), and/or the like.

In some aspects, the indicator may be an initial state of a cyclic redundancy check (CRC) that includes a predefined sequence of bits. For example, the base station 110 may use an initial sequence of CRC bits (e.g., all zeroes, all ones, or a particular sequence of zeroes and ones) when encoding the PDCCH payload. In this case, different initial sequences of CRC bits may be used for different indications, as described above (e.g., in connection with using a dedicated bit field as the indicator). When the UE 120 decodes the PDCCH payload, the UE 120 may test using multiple different hypotheses about the initial state of the CRC, and the initial state that is the correct hypothesis (e.g., that results in proper decoding with a CRC check that passes) may indicate whether the PDCCH payload includes data, may indicate whether the PDCCH payload includes DCI, and/or may indicate one or more other indications described above.

As shown by reference number 740, the UE 120 may receive the indicator in the PDCCH payload, and may use the indicator to obtain the data and/or the DCI. For example, if the indicator indicates that the PDCCH payload includes data, then the UE 120 may obtain the data directly from the PDCCH payload (e.g., rather than interpreting the data as DCI). Conversely, if the indicator indicates that the PDCCH payload includes DCI, then the UE 120 may use the DCI to obtain the data on the PDSCH. In some aspects, the PDCCH payload may be encoded using polar coding, and the UE 120 may use successive cancellation and/or another suitable technique to decode the PDCCH payload.

In some aspects, the UE 120 may obtain the data from multiple PDCCH payloads if the indicator indicates that the data has been segmented across multiple PDCCH payloads. Additionally, or alternatively, the UE 120 may use the indicator to determine the start of the segmented data, an end of the segment data, a number of PDCCH payloads that include the segmented data, and/or the like.

As shown by reference number 750, the base station 110 may selectively transmit the data in the PDCCH payload or the PDSCH payload based at least in part on the size of the data. For example, the base station 110 may transmit the data in the PDCCH payload (or may segment the data across multiple PDCCH payloads) if a size of the data does not satisfy a threshold, as described above. In this case, the indicator in the PDCCH payload may indicate that the PDCCH payload includes the data, and the UE 120 may use the indicator to determine that the PDCCH payload includes the data. Based at least in part on this determination, the UE 120 may obtain the data from the PDCCH payload.

Alternatively, the base station 110 may transmit the data in the PDSCH payload if a size of the data satisfies a threshold, as described above. In this case, the indicator in the PDCCH payload may indicate that the PDCCH payload includes DCI, and the UE 120 may use the indicator to determine that the PDCCH payload includes the DCI. Based at least in part on this determination, the UE 120 may use the DCI to obtain the data from the PDSCH payload.

In this way, the base station 110 and the UE 120 may transmit and receive data in a PDCCH payload when the data is small, thereby taking advantage of efficiencies associated with transmitting small data on the PDCCH, including conserving network resources (e.g., by using only the PDCCH instead of both the PDCCH and the PDSCH), conserving resources (e.g., processing power, battery power, memory, and/or the like) of the base station 110 and the UE 120 (e.g., due to processing only the PDCCH payload instead of both PDCCH and PDSCH payloads), reducing latency for small data (e.g., that can be transmitted in a limited number of PDCCH payloads) improving reliability for small data using polar coding, and/or the like. Furthermore, the base station 110 and the UE 120 may transmit and receive data in a PDSCH payload when the data is large, thereby taking advantage of efficiencies associated with transmitting large data on the PDSCH, including improving performance for large data (e.g., when the data is too large to efficiently communicate on the PDCCH), reducing latency for large data (e.g., that would require a large number of PDCCH payloads that are separated in time), improving reliability for large data using LDPC coding, and/or the like.

As indicated above, FIG. 7 is provided as an example. Other examples are possible and may differ from what was described with respect to FIG. 7.

Figure 8:
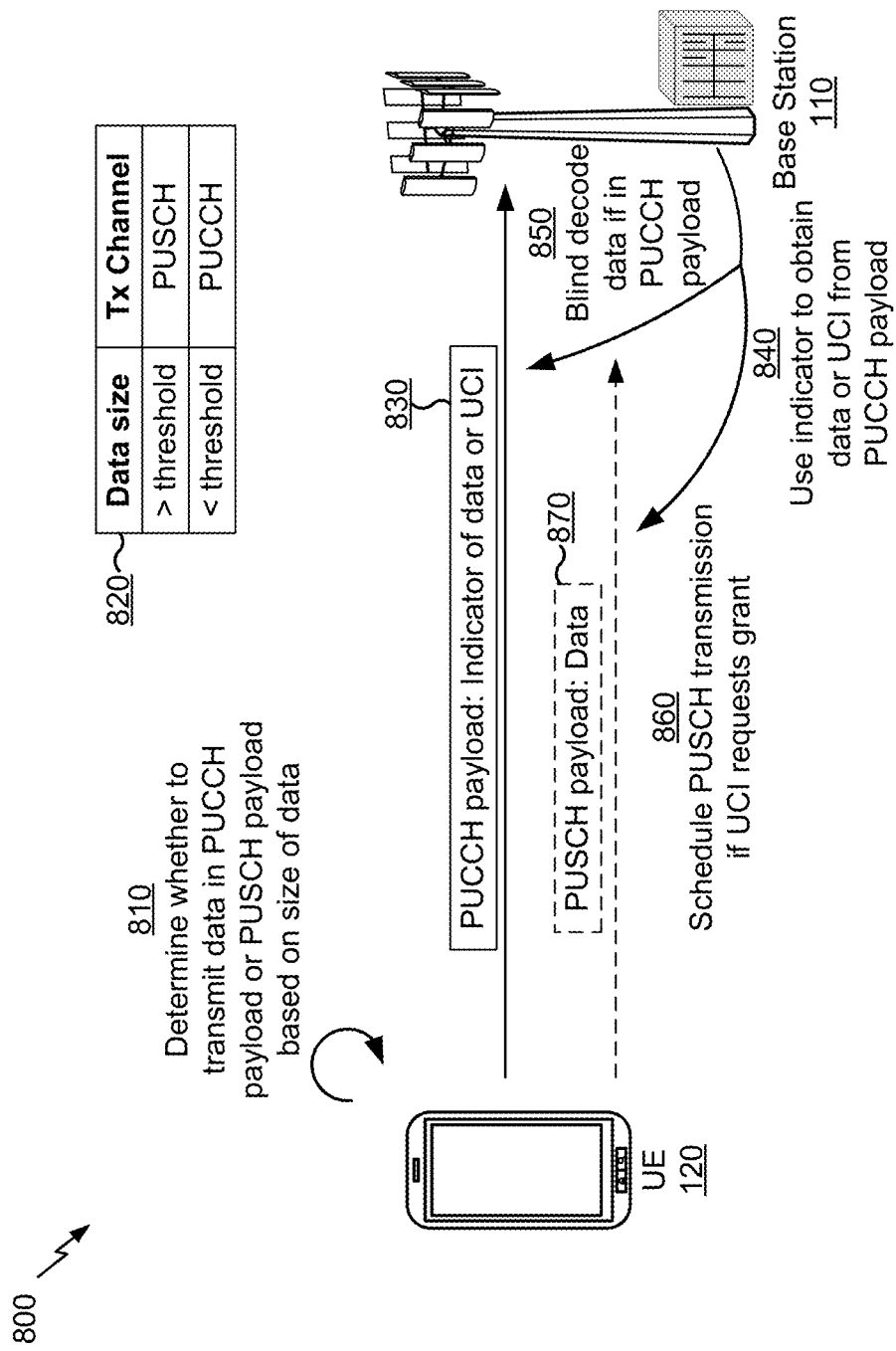

FIG. 8 is a diagram illustrating another example 800 of transmitting data in a control channel, in accordance with various aspects of the present disclosure.

As shown in FIG. 8, a base station 110 and a UE 120 may communicate with one another. For example, the UE 120 may transmit uplink data (e.g., a MAC PDU and/or the like) to the base station 110. In some cases, the uplink data may be transmitted on a PUSCH. However, in some scenarios, transmitting data on the PUSCH may be inefficient. For example, when data is transmitted on the PUSCH, DCI must first be received on the PDCCH. The DCI indicates information to be used to encode and/or transmit the data on the PUSCH, such as MCS used to modulate and/or encode the data, and/or the like. This design may be efficient for a large amount of data, but may be inefficient for a small amount of data. This may lead to inefficient use of device and/or network resources, particularly in scenarios where small data packets are communicated more frequently than large data packets, as described above in connection with FIG. 7.

As an example, for data with a small packet size of 60 bits, 40 bits of PDCCH payload may be used to indicate DCI for transmitting the data, and 60 bits of PUSCH payload may be used to transmit the data, for a total of 100 bits that consume network and device resources. In some aspects, this small amount of data may be transmitted directly in the PUCCH, for a total of 60 bits that consume network and device resources, thereby saving 40 bits of consumed resources as compared to transmitting the data in the PUSCH. Furthermore, in 5G/NR, information carried on the PUCCH may be encoded using polar coding, and information carried on the PUSCH may be encoded using low-density parity-check (LDPC) coding. For small block sizes, polar coding outperforms LDPC coding, and thus small amounts of data may be transmitted more reliably on the PUCCH as compared to the PUSCH. Furthermore, there may be a delay between receiving the DCI in the PDCCH and transmitting the corresponding data on the PUSCH (e.g., due to a structure of a slot, as described above in connection with FIGS. 5 and 6, due to a sequence of slot types that do not include the PUSCH, and/or the like). Since the resource allocation for PUCCH may be preconfigured (e.g., during radio resource control (RRC) signaling and/or the like), this resource allocation may be used to directly transmit data on the PUCCH.

However, if the UE 120 sometimes transmits data on the PUCCH, sometimes transmits data on the PUSCH, and/or sometimes transmits uplink control information (UCI) on the PUCCH, then the base station 110 may encounter errors if the base station 110 is unable to determine how to interpret and/or use the information (e.g., data or UCI) received on the PUCCH. Some techniques and apparatus described herein permit the UE 120 to indicate whether the PUCCH is being used to carry data or UCI, thereby reducing errors at the base station 110 and allowing for dynamic use of the PUCCH or the PUSCH for data transmission depending on a size of the data. In this way, the PUCCH may be used for increased efficiency when the data is small, and the PUSCH may be used for increased efficiency when the data is large. Additional details are described below.

As shown by reference number 810, the UE 120 may determine whether to transmit data in a PUCCH payload or a PUSCH payload based at least in part on a size of the data. For example, as shown by reference number 820, the UE 120 may determine to transmit the data in the PUSCH payload when the size of the data satisfies a threshold (e.g., is greater than the threshold, is greater than or equal to the threshold, and/or the like). Conversely, the UE 120 may determine to transmit the data in the PUCCH payload when the size of the data does not satisfy the threshold (e.g., is less than the threshold, is less than or equal to the threshold, and/or the like).

In some aspects, the threshold may be determined based at least in part on a size of the PUCCH payload. For example, if data is not to be segmented across multiple PUCCH payloads, then the threshold may be equal to the size of the PUCCH payload. In this way, the data may be transmitted in the PUCCH payload if the size of the data is less than or equal to the size of the PUCCH payload, and may be transmitted on the PUSCH otherwise. In some aspects, the UE 120 may determine a size of the PUCCH payload based at least in part on a set of candidate payload sizes for the PUCCH payload, which may be indicated by the base station 110. In this case, the UE 120 may determine a size of the PUCCH payload by selecting a candidate payload size from the set of candidate payload sizes. Additionally, or alternatively, the UE 120 may determine a size of the PUCCH payload based at least in part on a PUCCH resource allocation and/or a set of candidate coding rates for transmission of the PUCCH payload, either or both of which may be indicated to the UE 120 by the base station 110. In this case, the UE 120 may determine a size of the PUCCH payload by selecting a candidate coding rate, from the set of candidate coding rates, and applying the coding rate to the PUCCH resource allocation.

In some aspects, the UE 120 may determine to segment the data across multiple PUCCH payloads. In this case, the threshold may be greater than the size of a single PUCCH payload. In some aspects, the threshold may be determined based at least in part on a combined size of a number of PUCCH payloads, so as to limit segmentation of the data across no more than a threshold number of PUCCH payloads. Additionally, or alternatively, the UE 120 may use multiple thresholds to determine whether to transmit the data in a single PUCCH payload, to segment the data across multiple PUCCH payloads, or to transmit the data in a PUSCH payload. For example, the UE 120 may segment the data across multiple PUCCH payloads based at least in part on determining that the size of the data satisfies a first threshold (e.g., is greater than a first threshold for transmitting the data in a single PUCCH payload, is greater than or equal to the first threshold, and/or the like) but does not satisfy a second threshold (e.g., is less than a second threshold for transmitting the data on the PUSCH, is less than or equal to the second threshold, and/or the like).

As shown by reference number 830, the UE 120 may transmit, and the base station 110 may receive, an indicator, in the PUCCH payload, that indicates whether the PUCCH payload includes the data or UCI. For example, the indicator may indicate that the PUCCH payload includes the UCI when the size of the data satisfies a threshold (e.g., is greater than the threshold, is greater than or equal to the threshold, and/or the like). Conversely, the indicator may indicate that the PUCCH payload includes the data when the size of the data does not satisfy the threshold (e.g., is less than the threshold, is less than or equal to the threshold, and/or the like). In some aspects, the UE 120 may encode the PUCCH payload using polar coding. In some aspects, before transmitting a PUCCH payload (e.g., regardless of whether the UE 120 has data to transmit), the UE 120 may determine whether the PUCCH payload is to include data or UCI, and may transmit an indicator, in the PUCCH payload, that indicates whether the PUCCH payload includes data or UCI. The base station 110 may use this indicator to obtain the data or the UCI from the PUCCH payload.

In some aspects, the indicator is included in a bit field, of the PUCCH payload, dedicated to indicating whether the PUCCH payload includes data or UCI. In some aspects, the indicator may be a binary indicator of one bit, where a first value of the bit indicates that the PUCCH payload includes data, and a second value of the bit indicates that the PUCCH payload includes UCI. In some aspects, the indicator may be multiple bits. In this case, different values of the indicator may indicate whether the PUCCH payload includes only data (and not UCI), includes only UCI (and not data), or includes both data and UCI (e.g., data and ACK/NACK feedback and/or the like). Additionally, or alternatively, if the data is included in the PUCCH, then different values of the indicator may indicate whether the data is self-contained within the PUCCH payload (e.g., within a single PUCCH payload) or segmented across multiple PUCCH payloads. Additionally, or alternatively, if the data is segmented across multiple PUCCH payloads, different values of the indicator may indicate a number of PUCCH payloads or segments used to transmit the data (e.g., a number of PUCCH payloads across which the data is segmented), a start of the data (e.g., an indication that a current PUCCH payload includes the start of the data), an end of the data (e.g., an indication that a current PUCCH payload includes the end of the data), and/or the like.

In some aspects, the indicator may be an initial state of a CRC that includes a predefined sequence of bits. For example, the UE 120 may use an initial sequence of CRC bits (e.g., all zeroes, all ones, or a particular sequence of zeroes and ones) when encoding the PUCCH payload. In this case, different initial sequences of CRC bits may be used for different indications, as described above (e.g., in connection with using a dedicated bit field as the indicator). When the base station 110 decodes the PUCCH payload, the base station 110 may test using multiple different hypotheses about the initial state of the CRC, and the initial state that is the correct hypothesis (e.g., that results in proper decoding with a CRC check that passes) may indicate whether the PUCCH payload includes data, may indicate whether the PUCCH payload includes UCI, and/or may indicate one or more other indications described above.

As shown by reference number 840, the base station 110 may receive the indicator in the PUCCH payload, and may use the indicator to obtain the data and/or the UCI. For example, if the indicator indicates that the PUCCH payload includes data, then the base station 110 may obtain the data directly from the PUCCH payload (e.g., rather than interpreting the data as UCI). Conversely, if the indicator indicates that the PUCCH payload includes UCI, then the base station 110 may obtain the UCI (e.g., ACK/NACK feedback, a request for an uplink grant, a scheduling request, and/or the like). In some aspects, the PUCCH payload may be encoded using polar coding, and the base station 110 may use successive cancellation and/or another suitable technique to decode the PUCCH payload.

In some aspects, the base station 110 may obtain the data from multiple PUCCH payloads if the indicator indicates that the data has been segmented across multiple PUCCH payloads. Additionally, or alternatively, the base station 110 may use the indicator to determine the start of the segmented data, an end of the segment data, a number of PUCCH payloads that include the segmented data, and/or the like.

As shown by reference number 850, if the PUCCH payload includes the data, then the base station 110 may perform blind decoding to obtain the data from the PUCCH payload. For example, the base station 110 may perform blind decoding of the data using a set of payload size hypotheses (e.g., one or more payload size hypotheses). In some aspects, the base station 110 may determine the set of payload size hypothesis based at least in part on a set of candidate payload sizes, for the PUCCH payload, indicated by the base station 110 to the UE 120. Additionally, or alternatively, the base station 110 may determine the set of payload size hypotheses based at least in part on a PUCCH resource allocation indicated by the base station 110 to the UE 120 and/or a set of candidate coding rates indicated by the base station 110 to the UE 120.

As shown by reference number 860, if the PUCCH payload includes UCI that requests an uplink grant, then base station 110 may schedule a PUSCH transmission for the UE 120, such as by transmitting an uplink grant for the UE 120 in DCI (e.g., transmitted on the PDCCH).

As shown by reference number 870, the UE 120 may selectively transmit the data in the PUCCH payload or the PUSCH payload based at least in part on the size of the data. For example, the UE 120 may transmit the data in the PUCCH payload (or may segment the data across multiple PUCCH payloads) if a size of the data does not satisfy a threshold, as described above. In this case, the indicator in the PUCCH payload may indicate that the PUCCH payload includes the data, and the base station 110 may use the indicator to determine that the PUCCH payload includes the data. Based at least in part on this determination, the base station 110 may obtain the data from the PUCCH payload. When the UE 120 transmits the data in the PUCCH payload in this manner, such transmission may be performed without first requesting (e.g., in UCI) and/or receiving (e.g., in DCI) an uplink grant for the transmission.

Alternatively, the UE 120 may transmit the data in the PUSCH payload if a size of the data satisfies a threshold, as described above. In this case, the UE 120 may request an uplink grant from the base station 110 (e.g., by transmitting a scheduling request). In some aspects, the uplink grant may be requested using UCI included in the PUCCH payload. In this case, the indicator in the PUCCH payload may indicate that the PUCCH payload includes UCI, and the base station 110 may use the indicator to determine that the PUCCH payload includes the UCI. Based at least in part on this determination, the base station 110 may determine that the UCI includes a request for an uplink grant, and may transmit an uplink grant to the UE 120 in DCI on the PDCCH. The UE 120 may use the uplink grant to schedule and transmit the data on the PUSCH.

In some aspects, the UE 120 may not request an uplink grant for transmission of data on the PUSCH, such as when the UE 120 is scheduled for uplink transmissions using semi-persistent scheduling or configured scheduling, when the UE 120 is configured for uplink grant-free transmissions, and/or the like. In this case, the UE 120 may not transmit a corresponding PUCCH payload if the UE 120 determines that the UE 120 is to transmit the data in the PUSCH payload.

In this way, the base station 110 and the UE 120 may transmit and receive data in a PUCCH payload when the data is small, thereby taking advantage of efficiencies associated with transmitting small data on the PUCCH, including conserving network resources (e.g., by using only the PUCCH instead of both the PDCCH and the PUSCH), conserving resources (e.g., processing power, battery power, memory, and/or the like) of the base station 110 and the UE 120 (e.g., due to processing only the PUCCH payload instead of both PDCCH and PUSCH payloads), reducing latency for small data (e.g., that can be transmitted in a limited number of PUCCH payloads) improving reliability for small data using polar coding, and/or the like. Furthermore, the base station 110 and the UE 120 may transmit and receive data in a PUSCH payload when the data is large, thereby taking advantage of efficiencies associated with transmitting large data on the PUSCH, including improving performance for large data (e.g., when the data is too large to efficiently communicate on the PUCCH), reducing latency for large data (e.g., that would require a large number of PUCCH payloads that are separated in time), improving reliability for large data using LDPC coding, and/or the like.

As indicated above, FIG. 8 is provided as an example. Other examples are possible and may differ from what was described with respect to FIG. 8.

Figure 9:
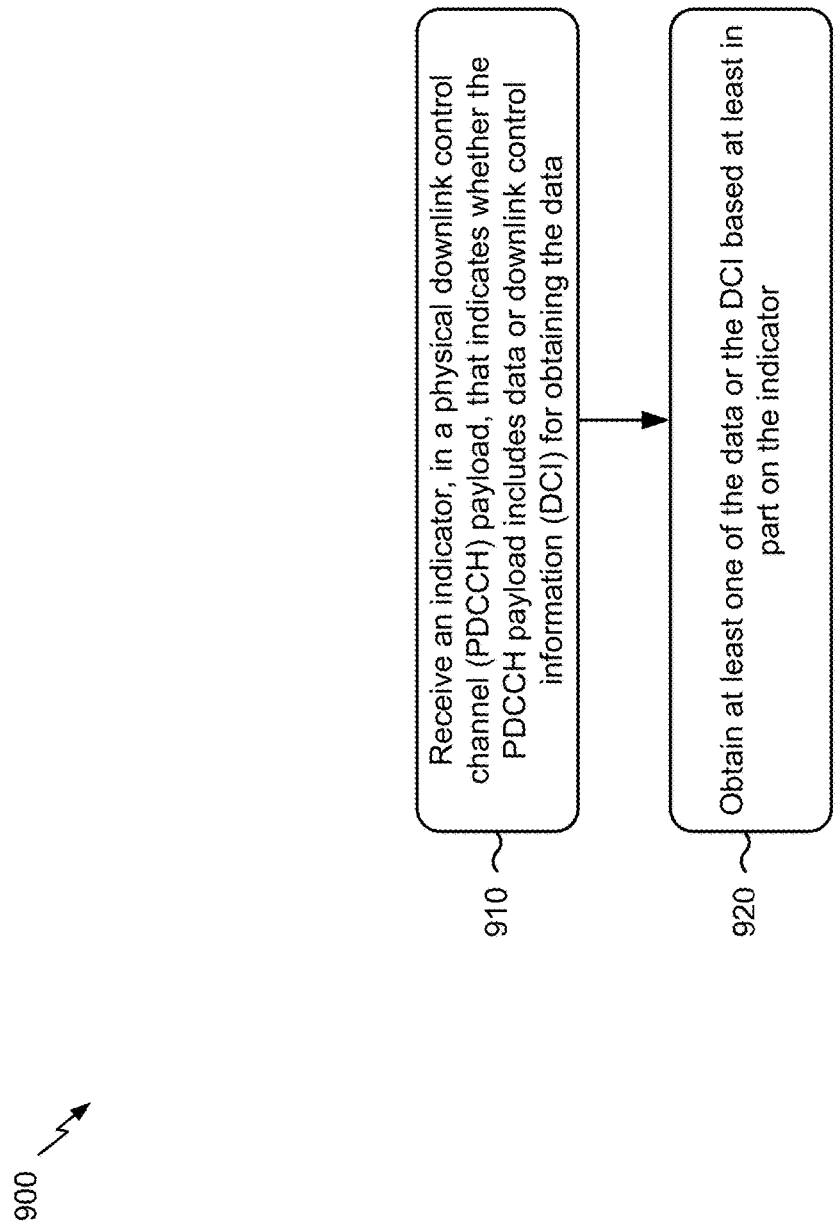

FIG. 9 is a diagram illustrating an example process 900 performed, for example, by a UE, in accordance with various aspects of the present disclosure. Example process 900 is an example where a UE (e.g., UE 120 and/or the like) performs operations relating to transmitting data in a control channel.

As shown in FIG. 9, in some aspects, process 900 may include receiving an indicator, in a physical downlink control channel (PDCCH) payload, that indicates whether the PDCCH payload includes data or downlink control information (DCI) for obtaining the data (block 910). For example, the UE (e.g., using antenna 252, DEMOD 254, MIMO detector 256, receive processor 258, controller/processor 280, and/or the like) may receive an indicator, in a PDCCH payload, that indicates whether the PDCCH payload includes data or DCI for obtaining the data, as described above in connection with FIG. 7.

As further shown in FIG. 9, in some aspects, process 900 may include obtaining at least one of the data or the DCI based at least in part on the indicator (block 920). For example, the UE (e.g., using controller/processor 280 and/or the like) may obtain at least one of the data or the DCI based at least in part on the indicator, as described above in connection with FIG. 7.

Process 900 may include additional aspects, such as any single aspect or any combination of aspects described below and/or in connection with one or more other processes described elsewhere herein.

In a first aspect, the indicator is included in a bit field, of the PDCCH payload, dedicated to indicating whether the PDCCH payload includes the data or the DCI. In a second aspect, alone or in combination with the first aspect, the indicator is one bit. In a third aspect, alone or in combination with one or more of the first and second aspects, the indicator is an initial state of a cyclic redundancy check that includes a predefined sequence of bits. In a fourth aspect, alone or in combination with one or more of the first through third aspects, the PDCCH payload is encoded using polar coding. In a fifth aspect, alone or in combination with one or more of the first through fourth aspects, a size of the PDCCH payload is determined based at least in part on a transmission mode for communications associated with the UE.

In a sixth aspect, alone or in combination with one or more of the first through fifth aspects, the indicator further indicates whether the data is self-contained within the PDCCH payload or segmented across multiple PDCCH payloads. In a seventh aspect, alone or in combination with one or more of the first through sixth aspects, the data is segmented across multiple PDCCH payloads, and wherein the indicator indicates at least one of: a number of PDCCH payloads or segments used to transmit the data, a start of the data, an end of the data, or some combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
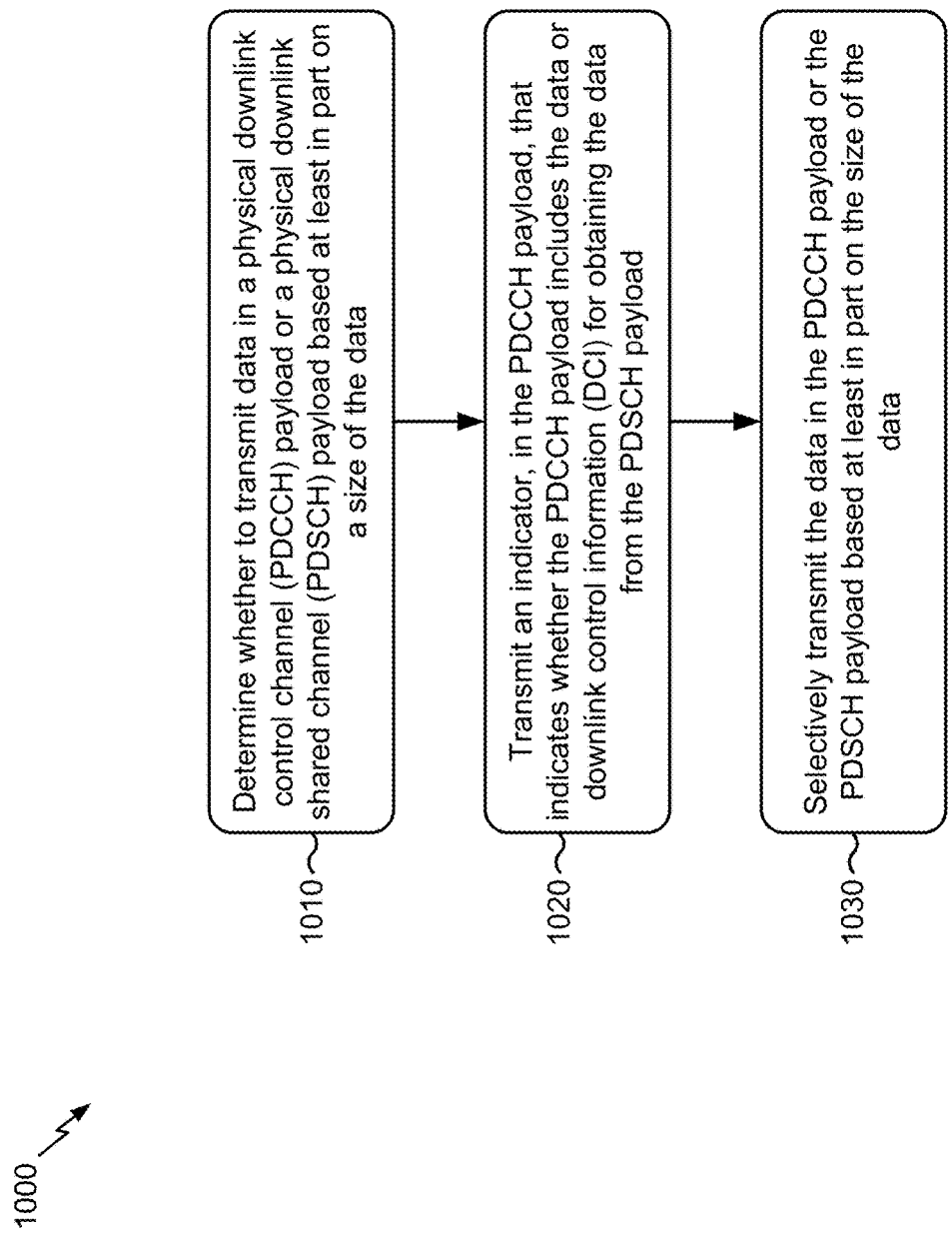

FIG. 10 is a diagram illustrating an example process 1000 performed, for example, by a base station, in accordance with various aspects of the present disclosure. Example process 1000 is an example where a base station (e.g., base station 110 and/or the like) performs operations relating to transmitting data in a control channel.

As shown in FIG. 10, in some aspects, process 1000 may include determining whether to transmit data in a physical downlink control channel (PDCCH) payload or a physical downlink shared channel (PDSCH) payload based at least in part on a size of the data (block 1010). For example, the base station (e.g., using controller/processor 240 and/or the like) may determine whether to transmit data in a PDCCH payload or a PDSCH payload based at least in part on a size of the data, as described above in connection with FIG. 7.

As further shown in FIG. 10, in some aspects, process 1000 may include transmitting an indicator, in the PDCCH payload, that indicates whether the PDCCH payload includes the data or downlink control information (DCI) for obtaining the data from the PDSCH payload (block 1020). For example, the base station (e.g., using controller/processor 240, transmit processor 220, TX MIMO processor 230, MOD 232, antenna 234, and/or the like) may transmit an indicator, in the PDCCH payload, that indicates whether the PDCCH payload includes the data or DCI for obtaining the data from the PDSCH payload, as described above in connection with FIG. 7.

As further shown in FIG. 10, in some aspects, process 1000 may include selectively transmitting the data in the PDCCH payload or the PDSCH payload based at least in part on the size of the data (block 1030). For example, the base station (e.g., using controller/processor 240, transmit processor 220, TX MIMO processor 230, MOD 232, antenna 234, and/or the like) may selectively transmit the data in the PDCCH payload or the PDSCH payload based at least in part on the size of the data, as described above in connection with FIG. 7.

Process 1000 may include additional aspects, such as any single aspect or any combination of aspects described below and/or in connection with one or more other processes described elsewhere herein.

In a first aspect, the data is transmitted in the PDSCH payload when the size of the data satisfies a threshold, or the data is transmitted in the PDCCH payload when the size of the data does not satisfy the threshold. In a second aspect, alone or in combination with the first aspect, the indicator indicates that the PDCCH payload includes the DCI when the size of the data satisfies a threshold, or the indicator indicates that the PDCCH payload includes the data when the size of the data does not satisfy the threshold.

In a third aspect, alone or in combination with one or more of the first and second aspects, the indicator is included in a bit field, of the PDCCH payload, dedicated to indicating whether the PDCCH payload includes the data or the DCI. In a fourth aspect, alone or in combination with one or more of the first through third aspects, the indicator is one bit. In a fifth aspect, alone or in combination with one or more of the first through fourth aspects, the indicator is an initial state of a cyclic redundancy check that includes a predefined sequence of bits. In a sixth aspect, alone or in combination with one or more of the first through fifth aspects, the PDCCH payload is encoded using polar coding. In a seventh aspect, alone or in combination with one or more of the first through sixth aspects, a size of the PDCCH payload is determined based at least in part on a transmission mode for communications associated with the base station.

In an eighth aspect, alone or in combination with one or more of the first through seventh aspects, the indicator further indicates whether the data is self-contained within the PDCCH payload or segmented across multiple PDCCH payloads. In a ninth aspect, alone or in combination with one or more of the first through eighth aspects, the data is segmented across multiple PDCCH payloads, and the indicator indicates at least one of: a number of PDCCH payloads or segments used to transmit the data, a start of the data, an end of the data, or some combination thereof. In a tenth aspect, alone or in combination with one or more of the first through ninth aspects, the base station may segment the data across multiple PDCCH payloads based at least in part on determining that the size of the data satisfies a first threshold but does not satisfy a second threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
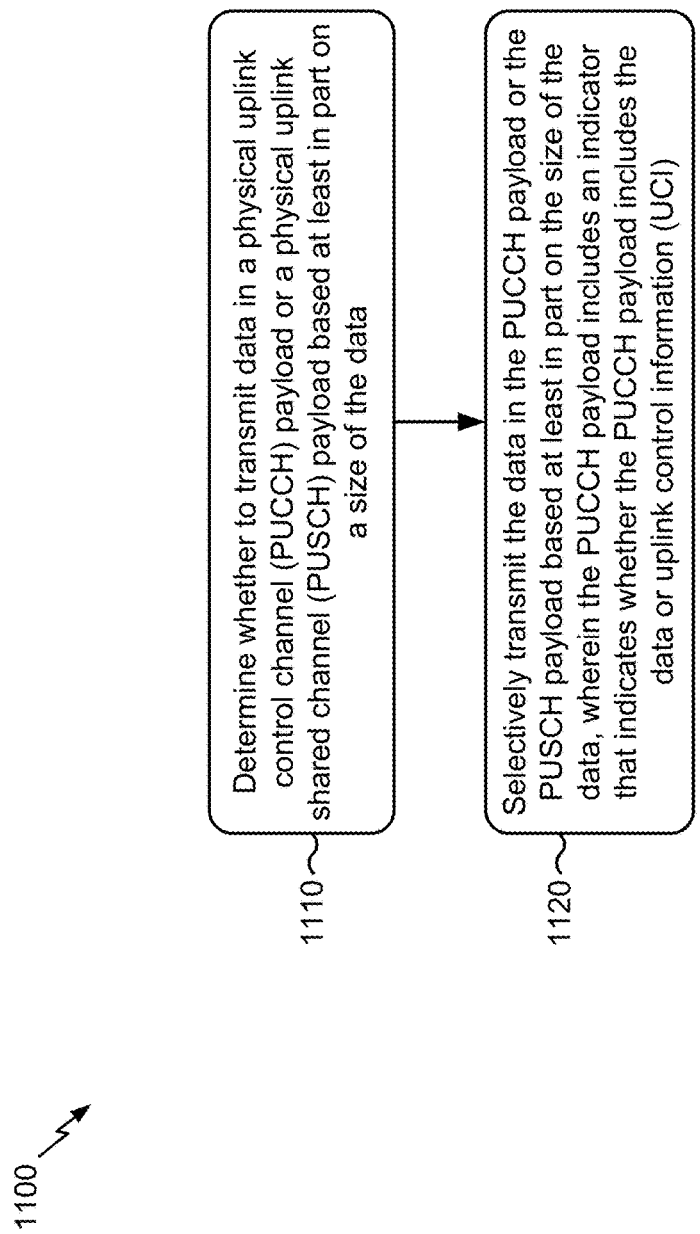

FIG. 11 is a diagram illustrating an example process 1100 performed, for example, by a UE, in accordance with various aspects of the present disclosure. Example process 1100 is an example where a UE (e.g., UE 120 and/or the like) performs operations relating to transmitting data in a control channel.

As shown in FIG. 11, in some aspects, process 1100 may include determining whether to transmit data in a physical uplink control channel (PUCCH) payload or a physical uplink shared channel (PUSCH) payload based at least in part on a size of the data (block 1110). For example, the UE (e.g., using controller/processor 280 and/or the like) may determine whether to transmit data in a PUCCH payload or a PUSCH payload based at least in part on a size of the data, as described above in connection with FIG. 8.

As further shown in FIG. 11, in some aspects, process 1100 may include selectively transmitting the data in the PUCCH payload or the PUSCH payload based at least in part on the size of the data, wherein the PUCCH payload includes an indicator that indicates whether the PUCCH payload includes the data or uplink control information (UCI) (block 1120). For example, the UE (e.g., using controller/processor 280, transmit processor 264, TX MIMO processor 266, MOD 254, antenna 252, and/or the like) may selectively transmit the data in the PUCCH payload or the PUSCH payload based at least in part on the size of the data, as described above in connection with FIG. 8.

Process 1100 may include additional aspects, such as any single aspect or any combination of aspects described below and/or in connection with one or more other processes described elsewhere herein.

In a first aspect, the data is transmitted in the PUSCH payload when the size of the data satisfies a threshold, or the data is transmitted in the PUCCH payload when the size of the data does not satisfy the threshold. In a second aspect, alone or in combination with the first aspect, the indicator indicates that the PUCCH payload includes the UCI to request an uplink grant for transmission of the data in the PUSCH payload when the size of the data satisfies a threshold, or the indicator indicates that the PUCCH payload includes the data when the size of the data does not satisfy the threshold.

In a third aspect, alone or in combination with one or more of the first and second aspects, the indicator is included in at least one of: a bit field, of the PUCCH payload, dedicated to indicating whether the PUCCH payload includes the data or the UCI, or an initial state of a cyclic redundancy check that includes a predefined sequence of bits. In a fourth aspect, alone or in combination with one or more of the first through third aspects, the indicator is one bit. In a fifth aspect, alone or in combination with one or more of the first through fourth aspects, the PUCCH payload is encoded using polar coding.

In a sixth aspect, alone or in combination with one or more of the first through fifth aspects, a set of candidate payload sizes for the PUCCH payload is indicated by a base station. In a seventh aspect, alone or in combination with one or more of the first through sixth aspects, a payload size for the PUCCH payload is determined based at least in part on a PUCCH resource allocation and a set of candidate coding rates indicated to the UE by a base station. In an eighth aspect, alone or in combination with one or more of the first through seventh aspects, the UE may segment the data across multiple PUCCH payloads based at least in part on determining that the size of the data satisfies a first threshold but does not satisfy a second threshold.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a base station, in accordance with various aspects of the present disclosure. Example process 1200 is an example where a base station (e.g., base station 110 and/or the like) performs operations relating to transmitting data in a control channel.

As shown in FIG. 12, in some aspects, process 1200 may include receiving an indicator, in a physical uplink control channel (PUCCH) payload, that indicates whether the PUCCH payload includes data or uplink control information (UCI) (block 1210). For example, the base station (e.g., using antenna 234, DEMOD 232, MIMO detector 236, receive processor 238, controller/processor 240, and/or the like) may receive an indicator, in a PUCCH payload, that indicates whether the PUCCH payload includes data or UCI, as described above in connection with FIG. 8.

As further shown in FIG. 12, in some aspects, process 1200 may include obtaining at least one of the data or the UCI based at least in part on the indicator (block 1220). For example, the base station (e.g., using controller/processor 240 and/or the like) may obtain at least one of the data or the UCI based at least in part on the indicator, as described above in connection with FIG. 8.

Process 1200 may include additional aspects, such as any single aspect or any combination of aspects described below and/or in connection with one or more other processes described elsewhere herein.

In a first aspect, the indicator is included in at least one of: a bit field, of the PUCCH payload, dedicated to indicating whether the PUCCH payload includes the data or the UCI, or an initial state of a cyclic redundancy check that includes a predefined sequence of bits. In a second aspect, alone or in combination with the first aspect, the indicator is one bit. In a third aspect, alone or in combination with one or more of the first and second aspects, the PUCCH payload is encoded using polar coding.

In a fourth aspect, alone or in combination with one or more of the first through third aspects, a set of candidate payload sizes for the PUCCH payload is indicated by the base station. In a fifth aspect, alone or in combination with one or more of the first through fourth aspects, a PUCCH resource allocation and a set of candidate coding rates are indicated by the base station. In a sixth aspect, alone or in combination with one or more of the first through fifth aspects, the base station may perform blind decoding of the data using a set of payload size hypotheses. In a seventh aspect, alone or in combination with one or more of the first through sixth aspects, the set of payload size hypotheses are determined based at least in part on at least one of: a set of candidate payload sizes, for the PUCCH payload, indicated by the base station, a PUCCH resource allocation indicated by the base station, a set of candidate coding rates indicated by the base station, or some combination thereof.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving an indicator, in a physical downlink control channel (PDCCH) payload, that indicates whether the PDCCH payload includes data or downlink control information (DCI) based at least in part on a size of the data, wherein the DCI is for obtaining the data from a physical downlink shared channel (PDSCH) payload, and wherein the indicator is an initial state of a cyclic redundancy check that includes a predefined sequence of bits; and
obtaining at least one of the data or the DCI based at least in part on the indicator.

2. The method of claim 1, wherein the PDCCH payload is encoded using polar coding.

3. The method of claim 1, wherein a size of the PDCCH payload is determined based at least in part on a transmission mode for communications associated with the UE.

4. The method of claim 1, wherein the indicator further indicates whether the data is self-contained within the PDCCH payload or segmented across multiple PDCCH payloads.

5. The method of claim 4, wherein the data is segmented across multiple PDCCH payloads, and wherein the indicator indicates at least one of:
a number of PDCCH payloads or segments used to transmit the data,
a start of the data,
an end of the data, or
some combination thereof.

6. A method of wireless communication performed by a network node, comprising:
transmitting an indicator, in a physical downlink control channel (PDCCH) payload, that indicates whether the PDCCH payload includes data or downlink control information (DCI) based at least in part on a size of the data, wherein the DCI is for obtaining the data from a physical downlink shared channel (PDSCH) payload, and wherein the indicator is an initial state of a cyclic redundancy check that includes a predefined sequence of bits; and
selectively transmitting the data in the PDCCH payload or the PDSCH payload based at least in part on the size of the data.

7. The method of claim 6, wherein the data is transmitted in the PDSCH payload when the size of the data satisfies a threshold, or wherein the data is transmitted in the PDCCH payload when the size of the data does not satisfy the threshold.

8. The method of claim 6, wherein the indicator indicates that the PDCCH payload includes the DCI when the size of the data satisfies a threshold, or wherein the indicator indicates that the PDCCH payload includes the data when the size of the data does not satisfy the threshold.

9. The method of claim 6, wherein the PDCCH payload is encoded using polar coding.

10. The method of claim 6, wherein a size of the PDCCH payload is determined based at least in part on a transmission mode for communications associated with the network node.

11. The method of claim 6, wherein the indicator further indicates whether the data is self-contained within the PDCCH payload or segmented across multiple PDCCH payloads.

12. The method of claim 11, wherein the data is segmented across multiple PDCCH payloads, and wherein the indicator indicates at least one of:
- a number of PDCCH payloads or segments used to transmit the data,
- a start of the data,
- an end of the data, or
- some combination thereof.

13. The method of claim 6, further comprising segmenting the data across multiple PDCCH payloads based at least in part on determining that the size of the data satisfies a first threshold but does not satisfy a second threshold.

14. A method of wireless communication performed by a user equipment (UE), comprising:
- transmitting an indicator, in a physical uplink control channel (PUCCH) payload, that indicates whether the PUCCH payload includes data or uplink control information (UCI) based at least in part on a size of the data, wherein the UCI is for obtaining the data using a physical uplink shared channel (PUSCH) payload, and wherein the indicator is an initial state of a cyclic redundancy check that includes a predefined sequence of bits; and
- selectively transmitting the data in the PUCCH payload or the PUSCH payload based at least in part on the indicator.

15. The method of claim 14, wherein the data is transmitted in the PUSCH payload when the size of the data satisfies a threshold, or wherein the data is transmitted in the PUCCH payload when the size of the data does not satisfy the threshold.

16. The method of claim 14, wherein the indicator indicates that the PUCCH payload includes the UCI to request an uplink grant for transmission of the data in the PUSCH payload when the size of the data satisfies a threshold, or wherein the indicator indicates that the PUCCH payload includes the data when the size of the data does not satisfy the threshold.

17. The method of claim 14, wherein the PUCCH payload is encoded using polar coding.

18. The method of claim 14, wherein a set of candidate payload sizes for the PUCCH payload is indicated by a network node.

19. The method of claim 14, wherein a payload size for the PUCCH payload is determined based at least in part on a PUCCH resource allocation and a set of candidate coding rates indicated to the UE by a network node.

20. The method of claim 14, further comprising segmenting the data across multiple PUCCH payloads based at least in part on determining that the size of the data satisfies a first threshold but does not satisfy a second threshold.

21. A method of wireless communication performed by a network node, comprising:
- receiving an indicator, in a physical uplink control channel (PUCCH) payload, that indicates whether the PUCCH payload includes data or uplink control information (UCI) based at least in part on a size of the data, wherein the UCI for obtaining the data from a physical uplink control channel (PUSCH) payload, and wherein the indicator is an initial state of a cyclic redundancy check that includes a predefined sequence of bits; and
- obtaining at least one of the data or the UCI based at least in part on the indicator.

22. The method of claim 21, wherein the PUCCH payload is encoded using polar coding.

23. The method of claim 21, wherein a set of candidate payload sizes for the PUCCH payload is indicated by the network node.

24. The method of claim 21, wherein a PUCCH resource allocation and a set of candidate coding rates are indicated by the network node.

25. The method of claim 21, further comprising performing blind decoding of the data using a set of payload size hypotheses.

26. The method of claim 25, wherein the set of payload size hypotheses are determined based at least in part on at least one of:
- a set of candidate payload sizes, for the PUCCH payload, indicated by the network node,
- a PUCCH resource allocation indicated by the network node,
- a set of candidate coding rates indicated by the network node, or
- some combination thereof.

27. A user equipment (UE) for wireless communication, comprising:
- memory; and
- one or more processors coupled to the memory, the one or more processors configured to:
  - receive an indicator, in a physical downlink control channel (PDCCH) payload, that indicates whether the PDCCH payload includes data or downlink control information (DCI) based at least in part on a size of the data, wherein the DCI is for obtaining the data from a physical downlink shared channel (PDSCH) payload, and wherein the indicator is an initial state of a cyclic redundancy check that includes a predefined sequence of bits; and
  - obtain at least one of the data or the DCI based at least in part on the indicator.

28. A non-transitory computer-readable medium storing one or more instructions for wireless communication, the one or more instructions comprising:
- one or more instructions that, when executed by one or more processors of a user equipment (UE), cause the one or more processors to:
  - receive an indicator, in a physical downlink control channel (PDCCH) payload, that indicates whether the PDCCH payload includes data or downlink control information (DCI) based at least in part on a size of the data, wherein the DCI is for obtaining the data from a physical downlink shared channel (PDSCH) payload, and wherein the indicator is an initial state of a cyclic redundancy check that includes a predefined sequence of bits; and
  - obtain at least one of the data or the DCI based at least in part on the indicator.

29. An apparatus for wireless communication, comprising:
- means for receiving an indicator, in a physical downlink control channel (PDCCH) payload, that indicates whether the PDCCH payload includes data or downlink control information (DCI) based at least in part on a size of the data, wherein the DCI is for obtaining the data from a physical downlink shared channel (PDSCH) payload, and wherein the indicator is an initial state of a cyclic redundancy check that includes a predefined sequence of bits; and
- means for obtaining at least one of the data or the DCI based at least in part on the indicator.

30. A network node for wireless communication, comprising:
    memory; and
    one or more processors coupled to the memory, the one or more processors configured to:
        transmit an indicator, in a physical downlink control channel (PDCCH) payload, that indicates whether the PDCCH payload includes data or downlink control information (DCI) based at least in part on a size of the data, wherein the DCI is for obtaining the data from a physical downlink shared channel (PDSCH) payload, and wherein the indicator is an initial state of a cyclic redundancy check that includes a predefined sequence of bits; and
        selectively transmit the data in the PDCCH payload or the PDSCH payload based at least in part on the size of the data.

31. A non-transitory computer-readable medium storing one or more instructions for wireless communication, the one or more instructions comprising:
    one or more instructions that, when executed by one or more processors of a network node, cause the one or more processors to:
        transmit an indicator, in a physical downlink control channel (PDCCH) payload, that indicates whether the PDCCH payload includes data or downlink control information (DCI) based at least in part on a size of the data, wherein the DCI is for obtaining the data from a physical downlink shared channel (PDSCH) payload, and wherein the indicator is an initial state of a cyclic redundancy check that includes a predefined sequence of bits; and
        selectively transmit the data in the PDCCH payload or the PDSCH payload based at least in part on the size of the data.

32. An apparatus for wireless communication, comprising:
    means for transmitting an indicator, in a physical downlink control channel (PDCCH) payload, that indicates whether the PDCCH payload includes data or downlink control information (DCI) based at least in part on a size of the data, wherein the DCI is for obtaining the data from a physical downlink shared channel (PDSCH) payload, and wherein the indicator is an initial state of a cyclic redundancy check that includes a predefined sequence of bits; and
    means for selectively transmitting the data in the PDCCH payload or the PDSCH payload based at least in part on the size of the data.

33. A user equipment (UE) for wireless communication, comprising:
    memory; and
    one or more processors coupled to the memory, the one or more processors configured to:
        transmit an indicator, in a physical uplink control channel (PUCCH) payload, that indicates whether the PUCCH payload includes data or uplink control information (UCI), wherein the UCI is for obtaining the data using a physical uplink shared channel (PUSCH) payload, and wherein the indicator is an initial state of a cyclic redundancy check that includes a predefined sequence of bits; and
        selectively transmit the data in the PUCCH payload or the PUSCH payload based at least in part on the indicator.

34. A non-transitory computer-readable medium storing one or more instructions for wireless communication, the one or more instructions comprising:
    one or more instructions that, when executed by one or more processors of a user equipment (UE), cause the one or more processors to:
        transmit, an indicator in a physical uplink control channel (PUCCH) payload, that indicates whether the PUCCH payload includes data or uplink control information (UCI) based at least in part on a size of the data, wherein the UCI for obtaining the data using a physical uplink shared channel (PUSCH) payload, and wherein the indicator is an initial state of a cyclic redundancy check that includes a predefined sequence of bits; and
        selectively transmit the data in the PUCCH payload or the PUSCH payload based at least in part on the indicator.

35. An apparatus for wireless communication, comprising:
    means for transmitting, an indicator in a physical uplink control channel (PUCCH) payload, that indicates whether the PUCCH payload includes data or uplink control information (UCI) based at least in part on a size of the data, wherein the UCI is for obtaining the data using a physical uplink shared channel (PUSCH) payload, and wherein the indicator is an initial state of a cyclic redundancy check that includes a predefined sequence of bits; and
    means for selectively transmitting the data in the PUCCH payload or the PUSCH payload based at least in part on the indicator.

36. A network node for wireless communication, comprising:
    memory; and
    one or more processors coupled to the memory, the one or more processors configured to:
        receive an indicator, in a physical uplink control channel (PUCCH) payload, that indicates whether the PUCCH payload includes data or uplink control information (UCI) based at least in part on a size of the data, wherein the UCI is for obtaining the data from a physical uplink shared channel (PUSCH) payload, and wherein the indicator is an initial state of a cyclic redundancy check that includes a predefined sequence of bits; and
        obtain at least one of the data or the UCI based at least in part on the indicator.

37. A non-transitory computer-readable medium storing one or more instructions for wireless communication, the one or more instructions comprising:
    one or more instructions that, when executed by one or more processors of a network node, cause the one or more processors to:
        receive an indicator, in a physical uplink control channel (PUCCH) payload, that indicates whether the PUCCH payload includes data or uplink control information (UCI) based at least in part on a size of the data, wherein the UCI is for obtaining the data using a physical uplink shared channel (PUSCH) payload, and wherein the indicator is an initial state of a cyclic redundancy check that includes a predefined sequence of bits; and
        obtain at least one of the data or the UCI based at least in part on the indicator.

38. An apparatus for wireless communication, comprising:
- means for receiving an indicator, in a physical uplink control channel (PUCCH) payload, that indicates whether the PUCCH payload includes data or uplink control information (UCI) based at least in part on a size of the data, wherein the UCI for obtaining the data using a physical uplink shared channel (PUSCH) payload, and wherein the indicator is an initial state of a cyclic redundancy check that includes a predefined sequence of bits; and
- means for obtaining at least one of the data or the UCI based at least in part on the indicator.

* * * * *